United States Patent
Shoemaker

[11] 4,054,369
[45] Oct. 18, 1977

[54] FOUR-COMPONENT MICROSCOPE OBJECTIVE

[75] Inventor: Arthur H. Shoemaker, East Aurora, N.Y.

[73] Assignee: American Optical Corporation, Southbridge, Mass.

[21] Appl. No.: 696,996

[22] Filed: June 17, 1976

[51] Int. Cl.² .............................................. G02B 9/34
[52] U.S. Cl. ............................. 350/175 ML; 350/220
[58] Field of Search .................... 350/175 ML, 220

[56] References Cited

U.S. PATENT DOCUMENTS 3,428,389  2/1969  Judd .............................. 350/175 ML

FOREIGN PATENT DOCUMENTS 891,469  9/1953  Germany .............................. 350/220

*Primary Examiner*—Paul A. Sacher
*Attorney, Agent, or Firm*—Alan H. Spencer; H. R. Berkenstock, Jr.

[57] ABSTRACT

A four-member microscope objective having a numerical aperture of 0.25 provides a magnification of substantially 10× and a substantially flat image field of 24mm in combination with a telescope objective as described in U.S. Pat. No. 3,355,234 and a typical 10× eyepiece.

3 Claims, 1 Drawing Figure

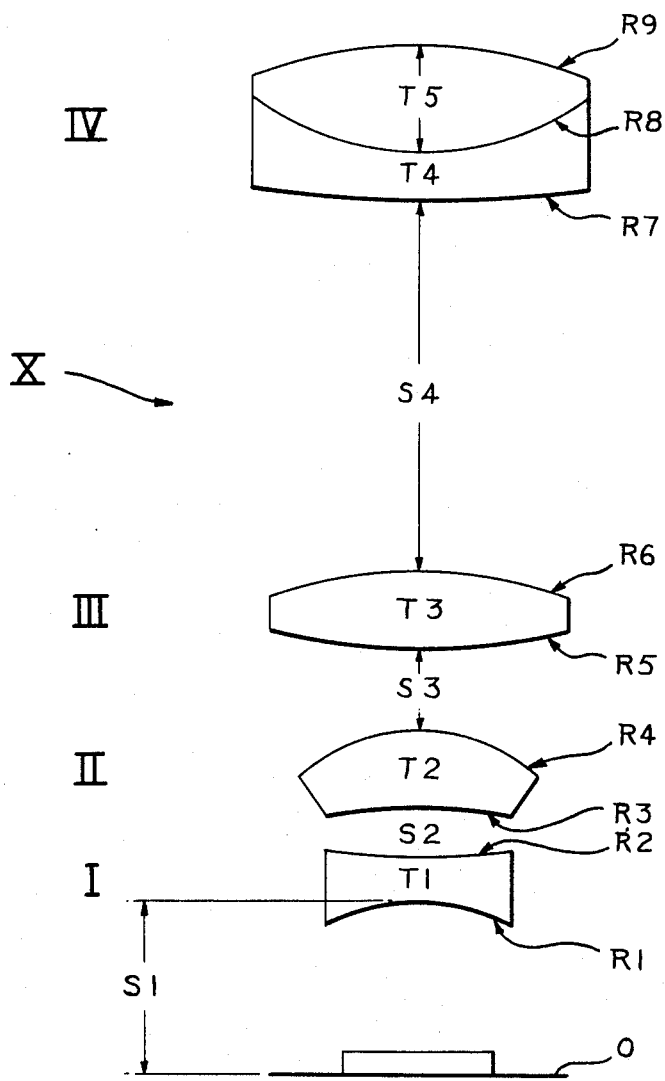

FOUR-COMPONENT MICROSCOPE OBJECTIVE

BACKGROUND OF THE INVENTION

The present invention relates to microscope objectives, and more particularly, to an achromatic microscope objective with a numerical aperture of substantially 0.25 having four components. It is an object of this invention to provide such a microscope objective which is well-corrected for the usual chromatic image aberrations as well as spherical aberration, coma and astigmatism, while providing a substantially flat image field of 24mm and a 10X magnification in combination with a telescope objective as described in U.S. Pat. No. 3,355,234 and a typical 10X eyepiece.

The closest known prior art is U.S. Pat. No. 3,041,934 issued July 3, 1962 to Rubin et al. This patent discloses a flat field objective having five elements. The principal distinguishing differences of the objective of the present invention and reference resides in the reversed position of the second and third elements; the absence of a doublet in the prior art objective and the prior art objective does not provide parallel light exiting the last member of the objective.

THE DRAWING AND THE INVENTION

The drawing is an optical diagram of an objective X having lens elements I, II, III and IV in alignment along an optical axis extending from object plane O.

The first element I is a biconcave negative singlet; the second element II is a positive meniscus singlet; followed by lens element III which is a biconvex positive doublet. The parameters of objective X are set forth in Table I wherein the axial thicknesses of successive lens elements are designated $T_1$ to $T_5$, and the successive axial spaces from the object plane O are designated $S_1$ to $S_4$. Successive lens radii are designated $R_1$ to $R_9$ where the minus sign (−) applies to surfaces whose center of curvature lies on the object side of their vertices. The refractive indices and Abbe number of the glasses in the successive lenses are absolute values and designated $ND_1$ to $ND_5$ and $\nu 1$ to $\nu 5$, respectively.

TABLE I

| Lens | Radius (R) | Thickness (T) | Spacing (S) | Index of Refraction (ND) | Abbe No. ($\nu$) |
|------|------------|---------------|-------------|--------------------------|-----------------|
|      |            |               | $S_1 = .27032B$ |                      |                 |
| I    | $R_1 = - .28454B$ | $T_1 = .08208B$ |         | $1.53 < ND_1 < 1.55$ | $\nu_1 \simeq 47$ |
|      | $R_2 = 3.91004B$  |                 |         |                      |                 |
|      |            |               | $S_2 = .08876B$ |                      |                 |
| II   | $R_3 = - 3.23135B$ | $T_2 = .13680B$ |        | $1.65 < ND_2 < 1.67$ | $\nu_2 \simeq 50$ |
|      | $R_4 = - .46730B$  |                 |        |                      |                 |
|      |            |               | $S_3 = .14752B$ |                      |                 |
| III  | $R_5 = 2.37855B$   | $T_3 = .13680B$ |        | $1.65 < ND_3 < 1.67$ | $\nu_3 \simeq 50$ |
|      | $R_6 = - 1.50260B$ |                 |        |                      |                 |
|      | $R_7 = + 28.4788B$ |               | $S_4 = .6660B$ |                      |                 |
| IV   | $R_8 = .80405B$    | $T_4 = .08208B$ |        | $1.77 < ND_4 < 1.79$ | $\nu_4 \simeq 26$ |
|      | $R_9 = - 1.2324B$  | $T_5 = .19152B$ |        | $1.56 < ND_5 < 1.58$ | $\nu_5 \simeq 56$ |

Wherein B is 16 to 21mm.

A specific embodiment of the present invention is an objective wherein B is equal to 18.275mm and has the values set forth in Table II wherein radii, thicknesses and spacings are in millimeters.

TABLE II

| Lens | Radius (R) | Thickness (T) | Spacing (S) | Index of Refraction (ND) | Abbe No. ($\nu$) |
|------|------------|---------------|-------------|--------------------------|-----------------|
|      |            |               | $S_1 = 4.940$ |                        |                 |
| I    | $R_1 = - 5.200$ | $T_1 = 1.500$ |           | $ND_1 = 1.54062$       | $\nu_1 = 47.14$ |
|      | $R_2 = 71.456$  |               |           |                        |                 |
|      |            |               | $S_2 = 1.622$ |                        |                 |
| II   | $R_3 = - 59.053$ | $T_2 = 2.500$ |          | $ND_2 = 1.65833$       | $\nu_2 = 50.86$ |
|      | $R_4 = - 8.540$  |               |          |                        |                 |
|      |            |               | $S_3 = 2.696$ |                        |                 |
| III  | $R_5 = 43.468$   | $T_3 = 2.500$ |          | $ND_3 = 1.65833$       | $\nu_3 = 50.86$ |
|      | $R_6 = - 27.460$ |               |          |                        |                 |
|      | $R_7 = 520.450$  |               | $S_4 = 12.171$ |                      |                 |
| IV   | $R_8 = 14.694$   | $T_4 = 1.500$ |          | $ND_4 = 1.78444$       | $\nu_4 = 26.07$ |
|      | $R_9 = - 22.522$ | $T_5 = 3.500$ |          | $ND_5 = 1.56874$       | $\nu_5 = 56.09$ |

The values of the objectives, as stated herein, are independent of normal manufacturing tolerances and may be modified with the scope of the invention as defined in claims.

What is claimed is:

1. A microscope objective having a numerical aperture of 0.25 which consists of, in alignment along an optical axis, a biconcave negative singlet I, a positive meniscus singlet II concave to the object side, a biconvex positive singlet III and a biconvex positive doublet IV consisting of a negative meniscus and a positive biconvex lens 2. The microscope objective of claim 1 having the following optical parameters

| Lens | Radius (R) | Thickness (T) | Spacing (S) | Index of Refraction (ND) | Abbe No. ($\nu$) |
|---|---|---|---|---|---|
| | | | $S_1 = .27032B$ | | |
| I | $R_1 = -.28454B$ | $T_1 = .08208B$ | | $1.53 < ND_1 < 1.55$ | $\nu_1 \approx 47$ |
| | $R_2 = 3.91004B$ | | | | |
| | | | $S_2 = .08876B$ | | |
| II | $R_3 = -3.23135B$ | $T_2 = .13680B$ | | $1.65 < ND_2 < 1.67$ | $\nu_2 \approx 50$ |
| | $R_4 = -.46730B$ | | | | |
| | | | $S_3 = .14752B$ | | |
| III | $R_5 = 2.37855B$ | $T = .13680B$ | | $1.65 < ND_3 < 1.67$ | $\nu_3 \approx 50$ |
| | $R_6 = -1.50260B$ | | | | |
| | | | $S_4 = .6660B$ | | |
| | $R_7 = +28.4788B$ | $T_4 = .08208B$ | | $1.77 < ND_4 < 1.79$ | $\nu_4 \approx 26$ |
| IV | $R_8 = .80405B$ | $T_5 = .19152B$ | | $1.56 < ND < 1.58$ | $\nu_5 \approx 56$ |
| | $R_9 = -1.2324B$ | | | | | wherein B is 16 to 21mm.

3. The microscope objective of claim 2 wherein B is equal to 18.275mm, $ND_1 = 1.54062$; $ND_2 = 1.65833$; $ND_3 = 1.65833$; $ND_4 = 1.78444$ and $ND_5 = 1.56874$ and $\nu_1 = 47.14$; $\nu_2 = 50.86$; $\nu_3 = 50.86$; $\nu_4 = 26.07$ and $\nu_5 = 56.09$.

* * * * *